Patented Nov. 27, 1945

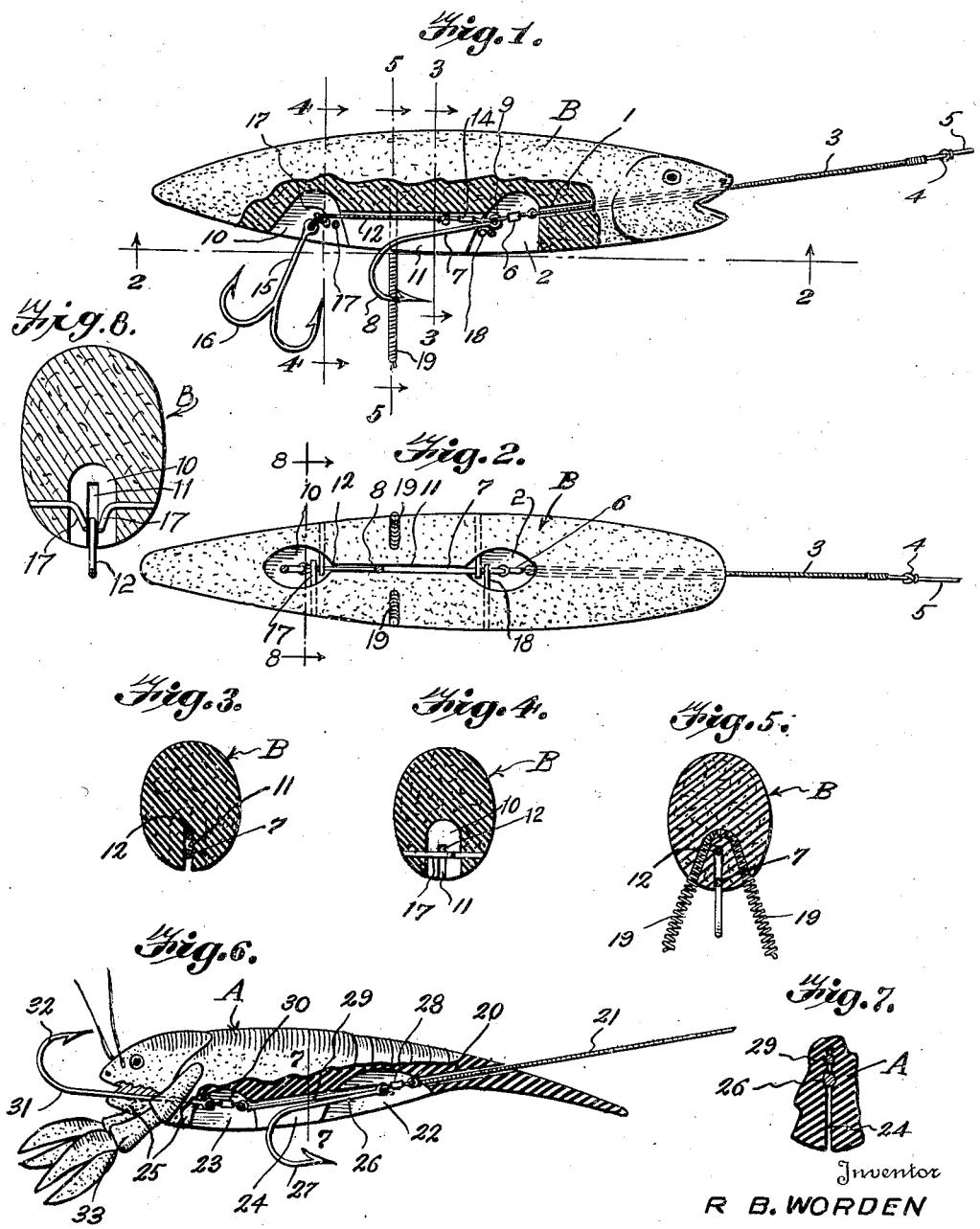

2,389,883

UNITED STATES PATENT OFFICE 2,389,883

FISH LURE

R B. Worden, Granger, Wash.

Application November 29, 1943, Serial No. 512,186

5 Claims. (Cl. 43—46)

This invention relates to fish lures, and it is an object of the invention to provide a device of this kind constructed in a manner whereby a hook or hooks may be conveniently attached or detached without requiring the use of pliers or kindred implements.

It is also an object of the invention to provide a fish lure of a type wherein the line and shaft of a hook may be concealed within the body of the lure but readily releasable as the result of a strike.

An additional object of the invention is to provide a device of this kind including a body having in its under or belly portion a cavity to receive the shank of a hook in a manner to place said hook in direct line of pull, whereby the device causes an action which substantially corresponds to the natural action of swimming and is void of a tendency to stand on its front or nose end from the pressure on the water exerted at such extremity.

A still further object of the invention is to provide a device of this kind including a body in simulation of a desired type of bait, such as a minnow, crawfish, or the like, and wherein the hook or hooks associated with the body are free of direct attachment thereto.

The invention consists in the details of construction and in the combination and arrangement of the several parts of my improved fish lure whereby certain important advantages are attained, as will be hereinafter more fully set forth.

In order that my invention may be better understood, I will now proceed to describe the same with reference to the accompanying drawing, wherein:

Figure 1 is a view partly in side elevation and partly in section illustrating a fish lure constructed in accordance with an embodiment of the invention;

Figure 2 is a view in bottom plan and partly in section, of the device as illustrated in Figure 1;

Figure 3 is a sectional view taken substantially on the line 3—3 of Figure 1;

Figure 4 is a sectional view taken substantially on the line 4—4 of Figure 1;

Figure 5 is a sectional view taken substantially on the line 5—5 of Figure 1;

Figure 6 is a view partly in side elevation and partly in section illustrating another embodiment of the invention; and Figure 7 is a detailed sectional view taken substantially on the line 7—7 of Figure 6.

Figure 8 is a sectional view taken on line 8—8 of Figure 2.

In the embodiment of the invention as illustrated in Figures 1 to 5 of the drawing, B denotes the body of the lure which is herein disclosed as in simulation of a minnow although I do not wish to be limited in this respect as the body B may be in simulation of any other bait as may be desired.

The forward or nose extremity of the body B is provided with a longitudinally disposed straight bore or reeveway 1 which is disposed on an inward and downward incline with the forward end of the bore or reeveway 1 above the longitudinal axis of the body B and the inner or rear end below such axis.

The inner or rear end of the bore or reeveway 1 communicates with the upper portion of a relatively deep cavity 2 provided in the belly or under portion of the body B at a point in advance of the longitudinal center of said body B.

Freely threading through the bore or reeveway 1 is a gut snell 3, the outer extremity of which is secured, as at 4, in a well known manner to the line 5. The rear extremity of the snell 3 is attached by a conventional coupling 6 to the shank 7 of the hook 8. This coupling 6 is engaged in the conventional eye 9 at the outer or free extremity of the shank 7.

The under surface or belly of the body B at a point rearwardly of the longitudinal center of said body is provided with a second relatively deep cavity 10 and the cavities 2 and 10 have interposed therebetween and in communication therewith a relatively narrow slot 11.

A snood 12 has one extremity connected to the eye 9 of the shank 7 by a coupling 14. To the opposite extremity of the snood 12 is attached the shank 15 of a gang hook 16. The snood 12 is of a length to extend within the cavity 10 when the snood 12 is engaged within the inner portion of the slot 11 and said extremity of the snood 12 is releasably held within the cavity 10 by the resilient pins 17 extending in the cavity from opposite faces of the cavity with the free extremities of the pins 17 overlapping and in close proximity one to the other, as illustrated in Figure 2 of the drawing. With the snood 12 in this position, the shank 15 of the gang hook 16 is to the rear of the pins 17 but closely adjacent thereto, whereby the gang hook 16 is initially supported in close proximity to the body B yet readily released by the strike on the hook 16 by the down pull on the overlapped pin ends by the snood 12, causing the pins to bend down until the snood passes between them, as shown in Figure 8.

The shank 7 of the hook 8 frictionally engages within the slot 11, as is illustrated in Figure 3 of the drawing, whereby said shank is entirely hidden or concealed within the body B yet is readily releasable from within the slot when a fish strikes. To further assure the shank 7 being held within the slot 11, the forward portion of the shank 7 overlies the oppositely disposed resilient pins 18 carried by the opposed walls of the cavity 2 with the inner or free extremities of the pins 18 in overlapping relation and in close proximity one to the other, as clearly illustrated in Figure 2 of the drawing.

It is to be noted that initially and as illustrated in Figure 1 of the drawing, the line 5 is in direct line of pull with the shank 7 which is of advantage as it allows the body B to have the natural action of swimming and prevents said body B standing on its forward or nose extremity from the pressure of the water exerted on said extremity. It is also to be particularly noted that the hooks 8 and 16 are free of securement to the body B and the general assembly is such as to permit the angler to conveniently attach or detach the hooks as desired without requiring the use of pliers or other implements.

The body B at a desired point intermediate its ends and preferably to the rear of its longitudinal center has depending therefrom the diverging weed guards 19 herein disclosed as comprising coiled springs of desired length.

In the embodiment of the invention as illustrated in Figures 6 and 7 of the drawing, the body A is in simulation of a crawfish although it may be otherwise formed and this body A is of rubber or other yielding material. The tail portion of the body A is provided therethrough with the inwardly and downwardly inclined bore or reeveway 20 through which freely passes an end portion of a snell 21.

The under or belly portion of the body A is provided with longitudinally spaced and relatively deep cavities 22 and 23 connected by an interposed slit 24. The rear cavity 23 has in communication therewith the slit 25 which opens out through the rear end of the body A. The slit 24, owing to the character of the material from which the body A is constructed, frictionally and effectually holds therein the shank 26 of a hook 27 yet readily permits release of the shank 26 upon a strike. This shank 26 is connected by a coupling 28 with the snell 21 and also coupled to the shank 26 is a snood 29 which is also adapted to be frictionally held within the slit 24. This snood 29 is coupled, as at 30, to the shank 31 of a second hook member 32. This shank 31 is initially adapted to be frictionally held within the slit 25 with the hook 32 disposed rearwardly of the body A and extending upwardly, as illustrated in Figure 6, although the hook 32, if desired, may be otherwise disposed. This shank 31 will also be readily released from within the slit 25 when a fish strikes the hook 32.

In the second embodiment of my invention, the weed guards 33 are in simulation of claws.

From the foregoing description it is thought to be obvious that a fish lure constructed in accordance with my invention is particularly well adapted for use by reason of the convenience and facility with which it may be assembled and operated.

What is claimed is:

1. A fish lure for use with a fish line and a hook carried thereby, comprising a body provided at one end portion with a reeveway for the line, said body in its under portion being provided with a cavity with which the reeveway communicates and with a slot extending lengthwise of the body and in communication with the cavity, said slot being of a width to frictionally receive the shank of the hook whereby said shank is hidden within the body.

2. A fish lure for use with a fish line and hooks carried thereby at spaced points, comprising a body having cavities in the under surface thereof spaced apart lengthwise of the body, the under surface of the body also having a slot interposed between the cavities and in communication therewith, an end portion of the body having a reeveway for the line in communication with one of the cavities, the slot frictionally receiving the shank of the forward hook, and a rearwardly disposed snood leading from the forward hook, the shank of a second hook being received in the second cavity.

3. A fish lure for use with a fish line and hooks carried thereby at spaced points, comprising a body having cavities in the under surface thereof spaced apart lengthwise of the body, the under surface of the body also having a slot interposed between the cavities and in communication therewith, an end portion of the body having a reeveway for the line in communication with one of the cavities, the slot frictionally receiving the shank of the forward hook, a rearwardly disposed snood leading from the forward hook, the shank of a second hook being received in the second cavity, and means within the cavities for releasably holding the shank of the first hook and the snood within the slot.

4. A fish lure for use with a fish line and a hook carried thereby, comprising a body provided in one end portion with a reeveway for the line, the under surface of the body being provided with a cavity and a longitudinally disposed slot in communication with the cavity to receive the shank of the hook, and means for co-action with the shank for releasably holding the same within the slot, said means being positioned within the cavity and including a yieldable pin extending within the cavity.

5. A fish lure for use with a fish line and a hook carried thereby, comprising a body provided in one end portion with a reeveway for the line, the under surface of the body being provided with a cavity to receive the shank of the hook, and means for co-action with the shank for releasably holding the same within the slot, said means being positioned within the cavity and including inwardly disposed pins carried by opposite walls of the cavity with the free extremities of the pins overlapping and in close proximity.

R. B. WORDEN.